March 28, 1961     E. B. SCHEFFER     2,976,841
LIVE CHINCHILLA FUR BRUSHING APPARATUS
Filed Oct. 16, 1959

INVENTOR.
ERVIN B. SCHEFFER
BY Gustave Miller
ATTORNEY

United States Patent Office 2,976,841
Patented Mar. 28, 1961

2,976,841
LIVE CHINCHILLA FUR BRUSHING APPARATUS
Ervin B. Scheffer, Box 125, Valley Springs, S. Dak.
Filed Oct. 16, 1959, Ser. No. 846,881
12 Claims. (Cl. 119—83)

This invention relates to a live animal fur brushing apparatus, and has for an object to provide an improved apparatus for brushing the fur of a live animal, such as a chinchilla or other fur bearing animal, so as to improve and build up the appearance of the pelt on the live animal, and particularly to make it unnecessary for the animal to chew its own fur in attempting to remove excessive hairs in hot weather. Chinchillas particularly, and some other fur bearing animals, have the habit of chewing their fur during hot weather to remove excess hairs and hairs which should be shed, particularly when the animals are raised in captivity. When the animals run wild and free, such hairs are generally removed by the fact that the animals live in neighborhoods where they squeeze through tight openings, and thus brush themselves continuously, getting rid of any excess hair. In captivity, however, such conditions do not prevail and as a result, some fur bearing animals develop the habit of chewing their fur to get rid of the excess hair, ruining the appearance, and thus the value, of the pelt.

With this invention, it becomes possible for the animal to easily brush its own hair, get rid of the excess hairs, and thus improve the appearance of the pelt so that the pelt will be in its prime at the time the animal is slaughtered and the pelt is used.

A further object of this invention is to provide a live animal fur brushing apparatus which may be made of comparatively inexpensive, yet comparatively permanent material, so that a number of the apparatus may be provided for the animals enabling them to keep their pelts in prime condition.

Still a further object of this invention is to provide a live animal fur brushing apparatus having means whereby when the animal passes through the apparatus, the animal, of necessity, brushes its own fur and removes any excess and undesired hairs.

Still a further object of this invention is to provide a live animal fur brushing apparatus made of a material which is resistant to the teeth of the animal and is able to withstand the hard wear and usage which it would undergo as a result of the animal's passing therethrough and therearound.

In brief, this live animal fur brushing apparatus consists of several brushes adjustably mounted between a pair of upstanding plates, the brushes having metal bristles with curved faces, the plates having aligned apertures therein defining a passageway into which the bristles extend, and through which the live animal passes and automatically brushes its fur as it does so.

With the above and related objects in view, this invention consists in the details of construction and combination of parts, as will be more fully understood from the following description, when read in conjunction with the accompanying drawing, in which.

Figure 1:
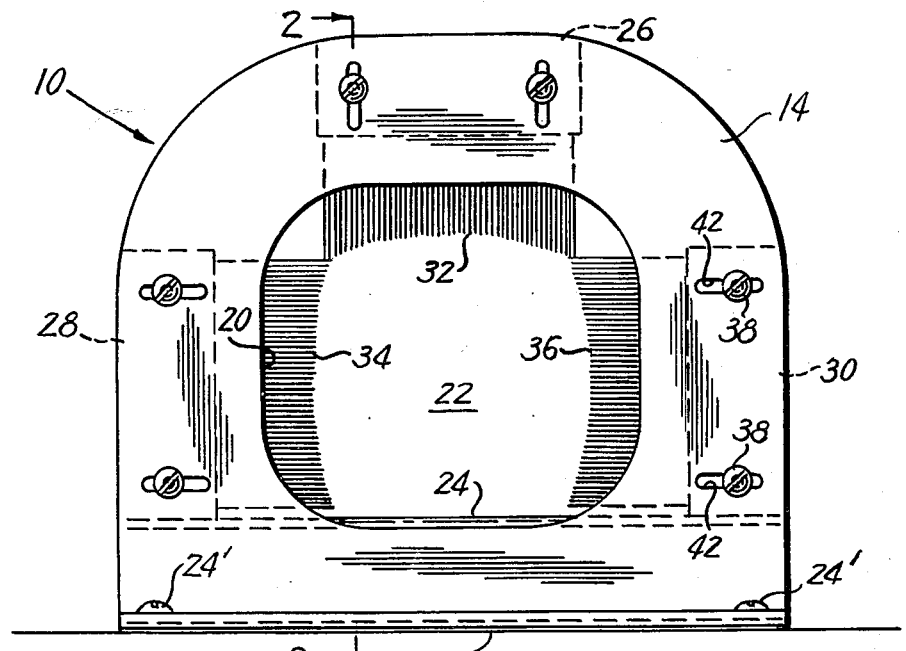
Fig. 1 is an elevational view of the live animal fur brushing apparatus of this invention.

There is shown at 10 the live animal fur brushing apparatus of this invention. As shown, this apparatus comprises a pair of spaced apart upstanding plates 12 and 14 supported on a base 16 and having a pair of aligned centrally located apertures 18 and 20 therein, the apertures 18 and 20 defining a passageway 22 therebetween. A floor 24 is provided for the passageway 22, and is located approximately in alignment with the bottom edge of the aligned apertures 18 and 20, as shown.

Figure 2:
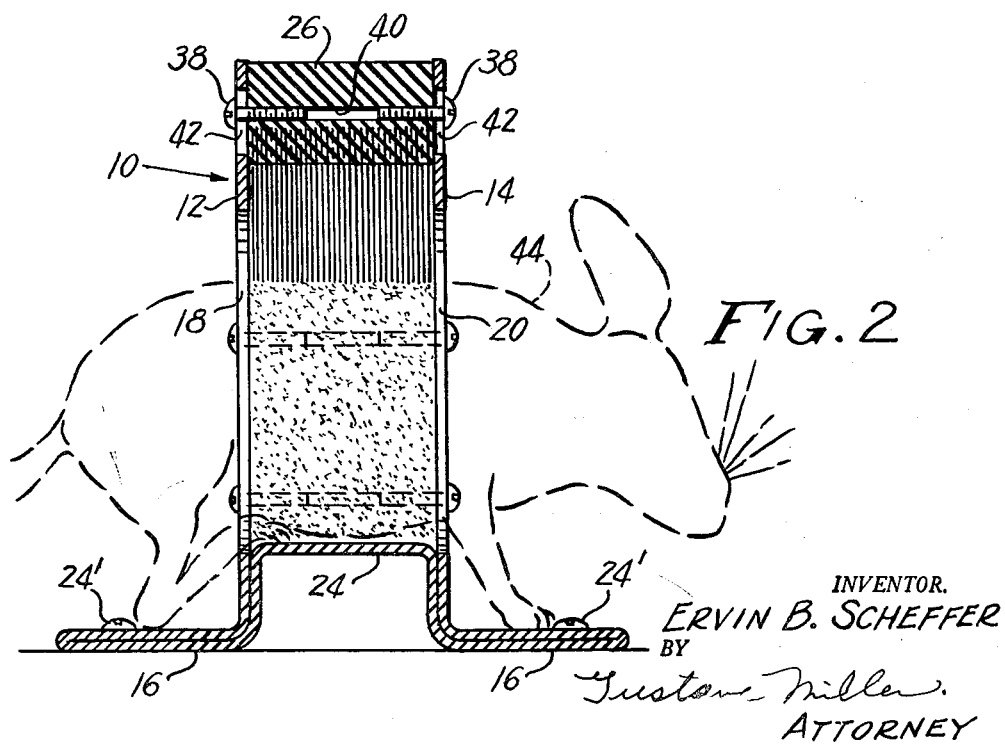
Fig. 2 is a sectional view on line 2—2 of Fig. 1, showing a live animal passing therethrough.

The upstanding plates 12, 14, the base 16 and the floor 22 are illustrated as being all made of a single piece of metal or other animal teeth-resisting material appropriately folded back and forth upon itself, as apparent from Fig. 2 from a single sheet, such as, preferably, of stainless steel, the base 16 being suitably apertured so as to receive bolts or screws 24' which may extend into the floor of an animal house or a concrete or other suitable securing means where the animals are permitted to congregate.

Obviously, the upstanding plates 12 and 14 could be separate pieces of metal and could be supported on a hardwood base, while the floor 24 could likewise be a block of hardwood between the two upstanding plates. Some live animals, such as chinchillas, for which this invention is particularly intended, are of the porcupine type and tend to chew on wood wherever it is available, and hence, if these parts are made of wood, they should necessarily be of hardwood rather than the soft woods, which would be easily destroyed by the teeth of the animal.

Brushing means are provided between the upstanding plates 12 and 14 and consist of a top brush handle 26 and two side brush handles 28 and 30, each of which have curved face bristles extending therefrom as at 32, 34 and 36 into the passageway 22. These bristles are preferably of metal, but of course could be of other suitable material, if desired, but in practice metal bristles have been found to be best.

The brush handles 26, 28 and 30 are secured between the uprights 12 and 14 by means of stud screws 38 extending into apertures 40, which apertures are located appropriately in the brush handles 26, 28 and 30. These stud bolts or screws 38 extend through slots 42 suitably located in each of the upstanding plates 12 and 14, there being two slots 42 for each of the brush handles, and the slots being suitably located so that when the bolts or screws 38 are slightly loosened, the brush handles may be adjusted so as to extend their bristles more or less into the passageway 22, thus enlarging or diminishing the size of the passageway according to the size of the animal which is to use the passageway. Thus, the size of the passageway is adjusted and different sized passageways may be provided, within limits, for different sized animals.

In Fig. 2, a live animal such as a chinchilla 44 has been illustrated in the process of using the fur brushing apparatus of this invention.

Thus, there has been provided a perfect chinchilla pelt builder which may be placed in a pen containing chinchillas which are closely confied for the rasing of pelts. This pelt builder, or fur brushing apparatus, will take over nature's means of ridding the animals of their extremely heavy under fur when the pelt is in the prime condition. In the wild, the chinchilla lives up in the mountains in crevices in the rocks, and is continuously crawling between these rocks and squeezing through the brush, thus getting rid of this heavy under fur, as nature intended. However, when being raised in pens, during hot weather, the animals will reach back and chew off their fur in order to thin it out and be more comfortable and thus, they become fur chewers by habit. As a pelt must be perfect to be of value, the chinchilla, through chewing his fur, tends to diminish or destroy the value of the pelt, but with this invention, the chinchilla brushes off the excess undercoat and this causes a perfect pelt at the proper time.

Although this invention has been described in considerable detail, such description is intended as being illustrative rather than limiting, since the invention may be variously embodied and the scope of the invention is to be determined as claimed.

Having thus set forth and disclosed the nature of this invention, what is claimed is:

1. A live chinchilla pelt builder fur brushing apparatus comprising a base of chinchilla teeth resistant material, a pair of upstanding spaced apart plates of similar material on said base, said plates having aligned apertures of a size providing a passageway to permit a live fur bearing chinchilla to pass therethrough, and fur brush means secured to said plates therebetween, said brush means having bristles extending into the passageway between said plates to brush the fur of a live chinchilla passing therethrough.

2. The apparatus of claim 1, and means for adjustably securing said brush means to said plates for adjusting the position of the bristles in the passageway.

3. The apparatus of claim 2, said adjustable securing means comprising brush fastening means extending through said brush means and through aligned slots in said upstanding plates.

4. The apparatus of claim 1, said brush means extending into the top side and the opposite sides of said passageway.

5. The apparatus of claim 4, and a floor on said base spaced above said base, said floor being free of said brush means.

6. The apparatus of claim 1, said apertures being centrally located in said plates and spaced above said base.

7. The apparatus of claim 3, said brush means comprising brush handles and metal bristles extending therefrom into said passageway, said fastening means comprising stud bolts threaded into said brush handles through said aligned slots.

8. The apparatus of claim 1, said base and said plates being of an integral piece of sheet metal.

9. The apparatus of claim 5, said floor, said base and said plates being of an integral piece of folded sheet metal.

10. A live chinchilla pelt builder fur brushing apparatus comprising a laterally extending metal base, a pair of upstanding spaced apart metal plates on said metal base spaced from the opposite lateral edges of said base, fur brush means secured to and between said plates and spaced above said base, said spaced apart plates having aligned apertures spaced above said base of a size providing a passageway to permit a live chinchilla to pass therethrough, said brush means having metal bristles extending into the sides and top of said passageway between said plates to brush the back and opposite sides of a live chinchilla passing therethrough, the bottom side of the chinchilla being free of brush means in passing through said passageway.

11. The apparatus of claim 10, and a metal floor supported between said plates and aligned with the bottoms of said aligned apertures in said plates.

12. A live chinchilla pelt builder fur brushing apparatus comprising a folded integral piece of sheet metal providing a pair of upstanding spaced apart plates having aligned apertures providing a passageway to permit a live chinchilla to pass therethrough, the bottoms of said plates extending laterally and oppositely from each other and then back toward each other providing a supporting base, then upwardly between said plates to the bottom of said apertures, and then transversely between said plates providing a floor aligned with the bottom of said apertures, live chinchilla fur brush means secured to and between said plates at the sides and top of said aligned apertures and having metal bristles extending into said passageway at the sides and top thereof providing a chinchilla back and side fur brushing means as a live chinchilla passes through said passageway, the bottom side of the chinchilla being free of brush means in passing through said passageway over said floor.

References Cited in the file of this patent

UNITED STATES PATENTS

| 1,627,516 | Larson | May 3, 1927 |
| 2,865,329 | Elliott | Dec. 23, 1958 |

FOREIGN PATENTS

| 461,582 | Germany | June 23, 1928 |
| 407,144 | Great Britain | Mar. 15, 1934 |